R. Y. NEELY.
SIGNAL FOR MOTOR VEHICLES.
APPLICATION FILED OCT. 9, 1919.
1,350,513.
Patented Aug. 24, 1920.
2 SHEETS—SHEET 2.
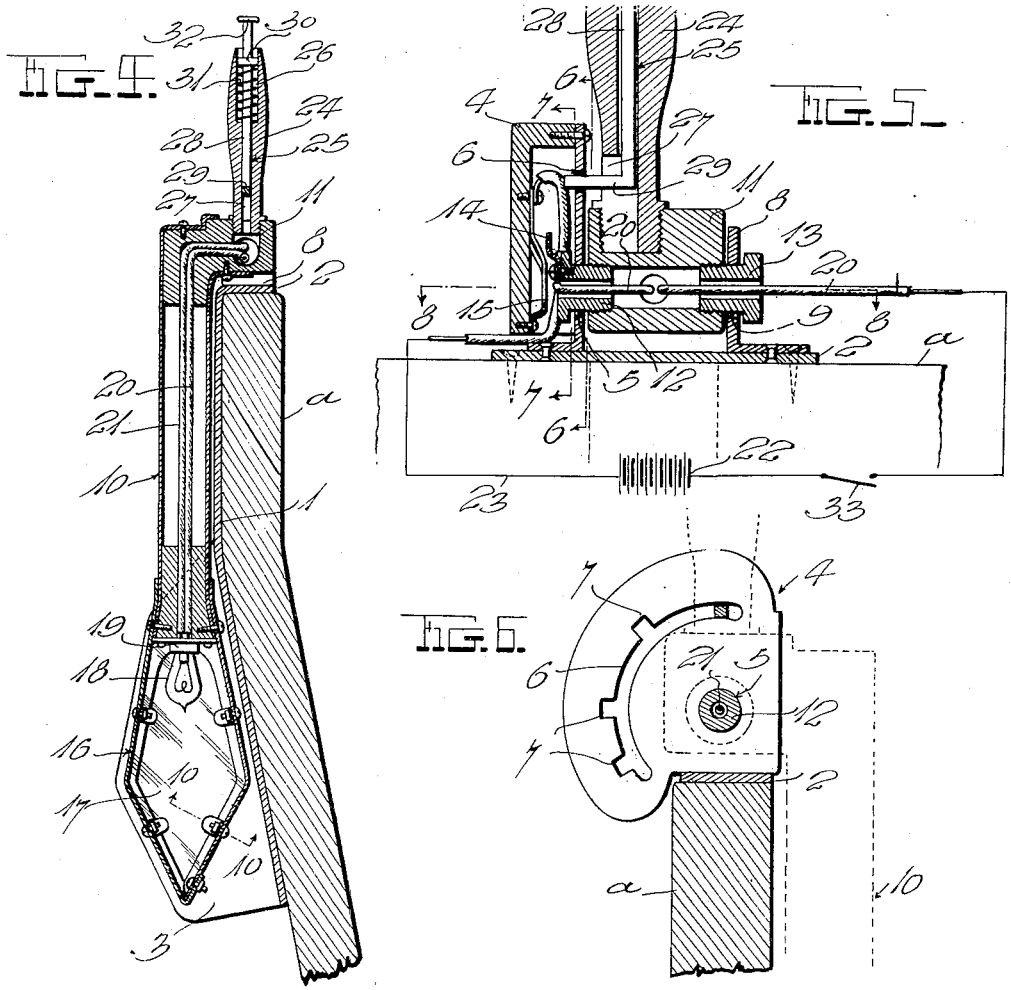
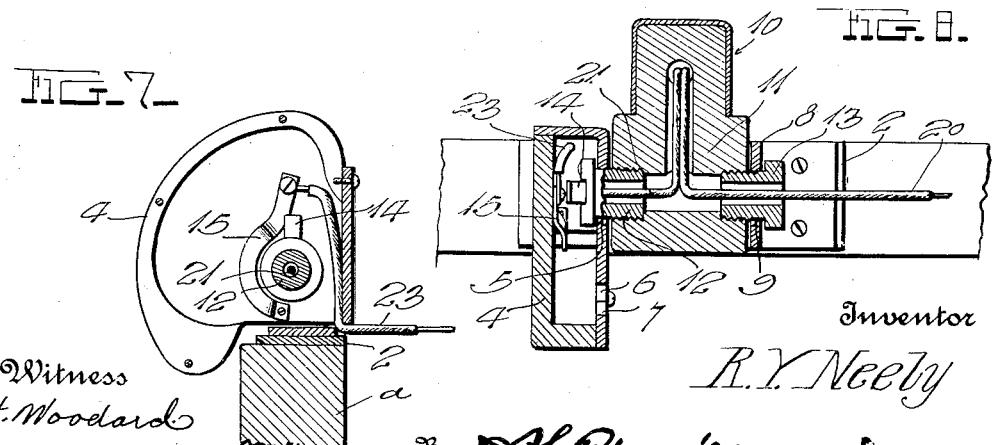
Witness
H. Woodard
Inventor
R. Y. Neely
By H. B. Wilson & Co.
Attorneys

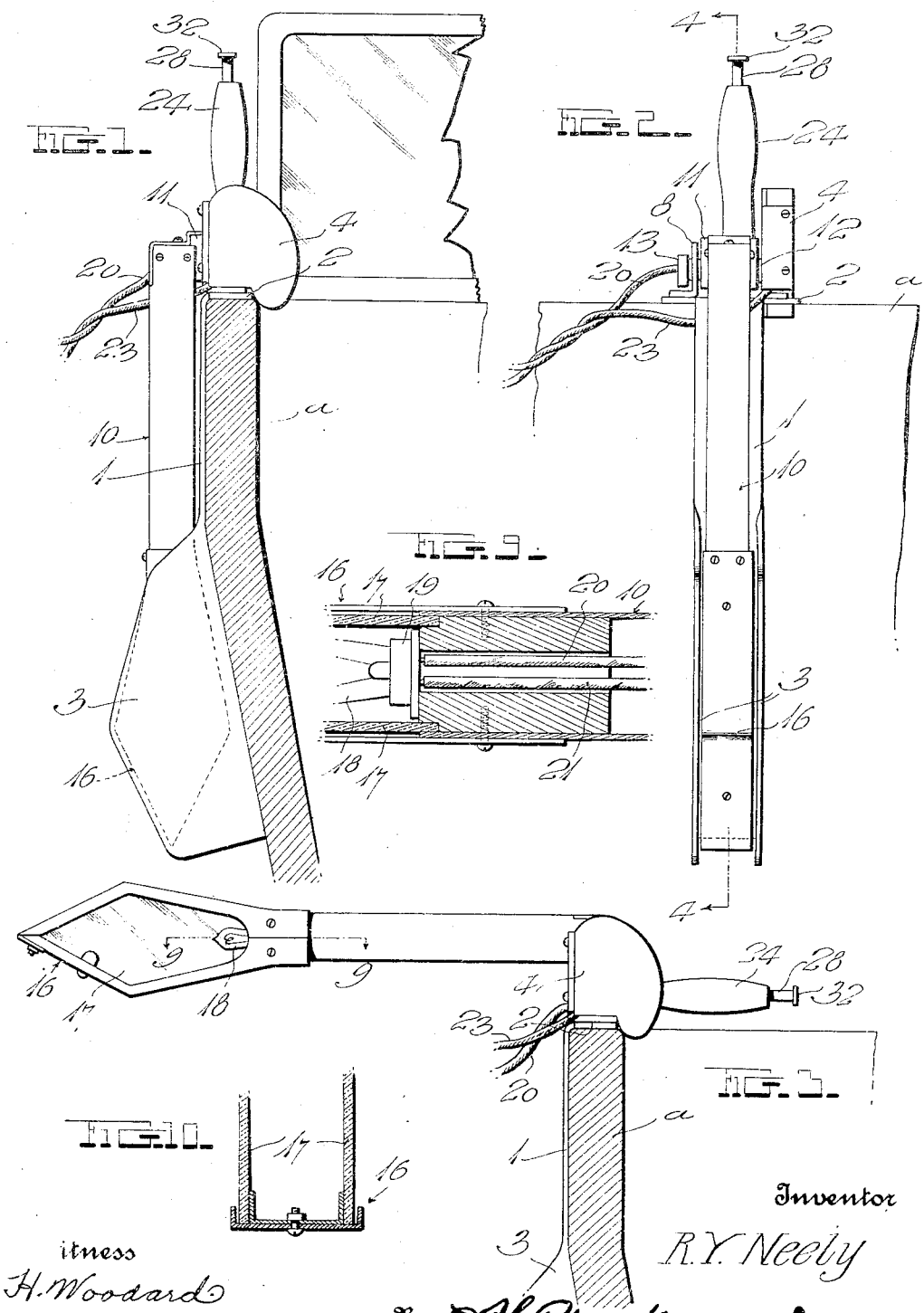

UNITED STATES PATENT OFFICE.

RANT Y. NEELY, OF WILLAMINA, OREGON.

SIGNAL FOR MOTOR-VEHICLES.

1,350,513.  Specification of Letters Patent.  Patented Aug. 24, 1920.

Application filed October 9, 1919. Serial No. 329,558.

*To all whom it may concern:*

Be it known that I, RANT Y. NEELY, a citizen of the United States, residing at Willamina, in the county of Yamhill and State of Oregon, have invented certain new and useful Improvements in Signals for Motor-Vehicles; and I do declare the following to be a full, clear, and exact description of the invention, such as will enable others skilled in the art to which it appertains to make and use the same.

This invention relates generally to motor vehicle accessories, and more particularly to signals for motor vehicles.

The principal object of the invention is to provide a semaphore signal adapted to be attached to one side of an automobile or other motor vehicle and having certain caution positions whereby pedestrians and drivers of other vehicles may be warned of the intention of the driver of the automobile to stop or turn in another direction.

Another object of the invention is to provide a device of this class which can be readily and easily attached to automobiles or other motor vehicles without first adapting the vehicle for the device, and to generally improve upon devices of this nature by the provision of a comparatively simple, strong, durable and inexpensive construction, one which will be efficient and reliable in operation, and well adapted to the purpose for which it is designed.

With these and other objects in view, the invention consists of the novel features of construction, and the combination and arrangement of parts as will be hereinafter fully described and claimed.

In the drawings in which similar reference characters designate like parts throughout the several views:

Figure 1 is a front view of a device constructed in accordance with this invention, showing it attached to one side of an automobile.

Fig. 2 is an elevation of the outer side of the device.

Fig. 3 is a front view of a portion of the housing of the device and the signal arm extending outwardly from the housing.

Fig. 4 is a longitudinal sectional view through the device taken on the line 4—4 of Fig. 2.

Fig. 5 is an enlarged vertical sectional view through the pivoted end of the semaphore arm and adjacent parts attached to the side of an automobile.

Figs. 6, 7 and 8 are detail sectional views taken on the planes indicated by the lines 6—6, 7—7 and 8—8 respectively of Fig. 5.

Fig. 9 is a detail sectional view taken on the plane indicated by the line 9—9 of Fig. 3, and Fig. 10 is a similar view taken on the plane indicated by the line 10—10 of Fig. 4.

In the embodiment illustrated the numeral 1 designates a plate which is bent to conform to the shape of the outer surface of one side $a$ of an automobile so as to contact therewith throughout its entire area, said plate being disposed in a general vertical position with its upper end bent inwardly at right angles as at 2 and overlying the upper edge of the side $a$ of the automobile. The plate is provided at its lower end with spaced parallel outwardly extending flanges 3 which are formed integrally with the plate at the edges thereof. The laterally bent end 2 of the plate 1 is considerably wider than said plate and is provided with suitable means by which it may be attached to the top edge of the side $a$ of the automobile. The means herein shown is in the form of ordinary wood screws.

Fixed to the plate which forms the laterally bent end 2 of the plate 1 is an upright casing 4, the inner wall of which is provided with a bearing opening 5 and an arcuate slot 6 disposed around the opening 5 as its center. At various intervals along the outer edge of the slot 6 are arranged notches 7. Fixed also to the plate which forms the laterally bent end 2 of the plate 1 is an upright ear 8 having a bearing opening 9 therein disposed in alinement with the opening 5 in the inner end of the casing 4.

The numeral 10 designates a semaphore arm, one end of which is provided with a right angular extension 11 carrying in its ends detachable trunnions 12 and 13 disposed in the bearing openings 5 and 9 respectively whereby to form a pivotal mounting for the semaphore arm. As clearly shown in Fig. 5 of the drawings the trunnion 12 extends into the casing 4 and carries a relatively movable switch member 14 adapted to contact under certain conditions with a relatively fixed switch member 15 attached to the outer wall of the casing 4.

The other end of the semaphore arm 10 is widened and then pointed to represent a pointer or arrow-head 16, the front and rear sides of which are provided with plates of transparent or colored glass 17. Disposed within the head 16 between the plates of glass 17 is an electric light bulb 18, the latter fitting in a socket 19 carried in the arm 10 and having connected thereto electric conductors 20 and 21. The conductor 20 passes through the arm 10, extension 11 thereof and out through the trunnion 13 and is connected to a source of electrical energy herein represented as an electric battery 22. The other conductor 21 extends through the arm 10, the extension 11 thereof and trunnion 12, and is connected to the switch member 14 carried by the latter. The electric circuit through the lamp is completed by means of a conductor 23 which extends from battery 22 to the switch member 15.

Threaded to extension 11 of the semaphore arm 10 is a handle 24, the latter extending in a general longitudinal direction with respect to the arm 10 and being provided with a central bore 25, the upper end of which is enlarged as at 26. One side of the handle 24 at the inner end thereof is provided with a transverse notch 27 which communicates with the bore 25. Disposed within the bore 25 is a sliding plunger 28 having its lower end 29 bent at right angles through the slot 27 and operating in the arcuate slot 6 and notches 7 in the adjacent end of casing 4. The other end of the plunger 28 carries a collar 30 between which and the shoulder formed at the junction of the bore 25 and enlarged portion 26 of the same is disposed a coil spring 31 which serves to hold the plunger 28 with its outer end projected out of the outer end of the handle 24. As shown by the drawings the outer end of the plunger 28 is provided with a flat portion or button 32.

The flanges 3 are shaped to conform to the contour of the outer edge of the head 16 of the semaphore arm so that when said arm is disposed in a vertical position pointing downwardly, head 16 will be entirely confined between the flanges 3.

The normal position of the semaphore arm is vertical with its head 16 pointing downwardly as shown in Fig. 1 of the drawings. From this it will also be seen that the handle 24 is disposed in a vertical position and when the parts are in this position and the driver of the automobile desires to bring the machine to a stop and warn pedestrians and drivers of other vehicles of his intention to stop, it is only necessary to grasp the handle 25 and swing it inwardly until the laterally bent end 29 of the plunger 28 snaps into the first notch 7 at the outer edge of the slot 6. The semaphore arm 10 will then be disposed substantially at an angle of forty-five degrees and pointing downwardly. After the machine has been brought to a stop the parts may be returned to their normal position by engaging the handle 24 and depressing plunger 28 by pressing the thumb upon the button 32. This moves the laterally bent end 29 of the plunger 28 out of the notch 7 and permits the semaphore arm to be swung, the end 29 of the plunger 28 sliding in the slot 6. If the driver of the automobile desires to turn to the left and warn pedestrians or drivers of other vehicles of that fact, it is only necessary to swing the semaphore arm 10 to a horizontal position, or until the laterally bent end 29 of the plunger 28 snaps into the second notch 7. If he desires to turn to the right the semaphore arm 10 is moved to a position where it points upwardly at an angle of about forty-five degrees, the laterally bent end 29 of the plunger 28 being in this case disposed in the third notch 7.

When the semaphore arm is disposed in this safety position, that is, when it is disposed vertically with its head 16 pointing downwardly, the switch member 14 is out of engagement with the switch member 15. As soon, however, as the arm 10 is moved out of this safety position, the switch member 14 engages switch member 15 and closes the circuit through the electric lamp bulb 18 so as to cause the lamp to burn. In the daytime there is no necessity for illuminating the semaphore arm, and the break in the circuit through the lamp is effected by opening a switch 33 disposed in said circuit.

From the foregoing description taken in connection with the accompanying drawings, the construction, use and operation of the device will be readily understood without a more extended explanation.

Various changes in form, proportion, and in the minor details of construction may be resorted to without departing from the spirit of the invention as defined in the appended claims.

What is claimed is:

1. A signal comprising spaced bearing plates having openings formed therein, a signal arm having a head positioned between said plates, one of the plates being provided with an arcuate slot having side notches, trunnions extending through the openings of said plates and screwed into the head of said arm to pivotally mount the arm, a handle carried by the head of said arm and having a longitudinally extending passage having its outer end portion enlarged and provided with a side opening, a locking plunger slidable in the passage of the handle and having its inner end portion bent to provide a finger extending through the side opening and into the arcuate slot, and resilient means in the enlarged portion of the passage engaging the plunger to yieldably retain the same in a set position with the finger in one of the side notches of the arcuate slot.

2. A signal comprising spaced bearing arms having openings formed therein and one having an arcuate slot provided with side notches, a semaphore arm having an offset head at one end extending between the arms, trunnions rotatably mounted in the openings of the bearing arms and connected with the head of said semaphore arm, a hollow handle carried by the semaphore head and having a side opening, and a latching plunger slidably mounted in the handle and having its inner end portion provided with a finger extending through the side opening of the handle into the arcuate slot.

3. A signal comprising bearing brackets, a hollow semaphore arm, an open sided housing for the semaphore arm having at its upper end a tongue extending rearwardly thereof and carrying the bearing brackets, a plug fitting into the hollow semaphore arm and extending between the bearing arms, a handle carried by the plug between the bearing arms, and a latch carried by the handle and releasably engaging one bearing arm.

In testimony whereof I have hereunto set my hand.

RANT Y. NEELY.